United States Patent Office 3,275,608
Patented Sept. 27, 1966

3,275,608
POLYMERS CONSISTING OF 1,3,4-OXADIAZOLE RINGS LINKED BY PERFLUOROALKYLENE AND OPTIONALLY, ARYLENE RADICALS
Franklin L. Montgomery, Wilmington, Del., and David C. Remy, Madison, Wis., assignors to E. I. du Pont de Nemours and Company, Wilmington, Del., a corporation of Delaware
No Drawing. Filed Aug. 6, 1962, Ser. No. 214,860
5 Claims. (Cl. 260—78.4)

This invention relates to novel fluorinated polymers and, more particularly, to thermally stable fluorinated polymers containing 1,3,4-oxadiazole groups in the polymeric chain and to a process for the preparation thereof.

It is an object of the present invention to provide novel thermally stable fluorinated polymers, which contain 1,3,4-oxadiazole groups in the polymeric chain. A further object is to provide novel elastomeric polymers. A still further object of the present invention is to provide a process for the preparation of these polymers. Other objects will appear hereinafter.

These are other objects that are accomplished by polymers consisting essentially of units, joined head-to-tail, having the structure:

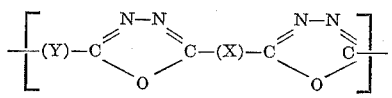

wherein in the same unit, X and Y are independently selected from the group consisting of —(CF$_2$)$_n$—, in which $n=3$–14, and arylene with the proviso that in the total number of units making-up the polymer (molecule) at least 30% mole of the total number of X's and Y's are —(CF$_2$)$_n$—. These polymers can be generally described as consisting of 1,3,4-oxadiazole rings linked by perfluoroalkylene radicals or separately by the latter and arylene radicals.

The polymeric 1,3,4-oxadiazoles of the present invention have many outstanding properties which render them particularly useful in numerous applications. Of special value are films and fibers made from these polymers. Several of these polymers are useful as covering and protective agents even in areas where corrosive conditions prevail; this is illustrated by the inertness of the polymer of Example 2, hereinafter, in sulfuric acid at 100° C. These films can be used as drum liners, outdoor coverings, and in many other applications. Molded parts can be prepared which are useful as gaskets and O-rings. Fibers of the polymer of this invention can be woven or made into fabrics which will retain their properties for long periods of time, even under certain circumstances where other fibers rapidly deteriorate; furthermore, they can be applied for other industrial and textile uses. Some of the polymers are elastomeric at temperatures above room temperature, for example the polymer of Example 2, and thus can be used for shock absorbers and vibration dampeners under hot corrosive working conditions.

The novel polymers of the present invention are prepared by the process which comprises contacting and reacting in the presence of an inert solvent, 0.875 to 1.125 molar proportions of a bis tetrazole of the formula:

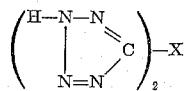

with a molar proportion of a diacyl halide of the formula:

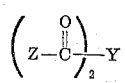

where Z=halogen, and the identity and relationship of X and Y are the same as described above with the exception that in the reactants, at least 30 mole percent of the total number of X's and Y's must be —(CF$_2$)$_n$—. The reaction is conducted at elevated temperatures and for a sufficient time to obtain the polymer product described above.

With reference to the composition of the novel polymers of the present invention, it is preferred that the arylene radical be an aromatic hydrocarbon radical of from 6–18 carbon atoms, optionally substituted by one or more of the following groups: an alkyl radical, an alkoxy radical, a halogen atom, a nitro group or a carboxy group, the residual valences of said aromatic hydrocarbon radical being on different carbon atoms. It is particularly preferred that the alkyl and alkoxy substituents on the arylene radical be lower alkyl and lower alkoxy. The arylene radical is preferably phenylene, but it can also be o- and peri-naphthylene, biphenylene, oxydiphenylene, phenanthrylene and anthrylene. The halogen substituents can include chlorine, bromine, fluorine, and iodine.

The fluorinated polymers of this invention include those compounds which consist essentially of units of the following general types arranged connected in head-to-tail fashion:

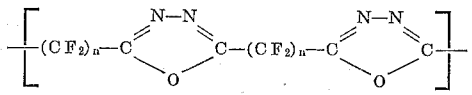

and

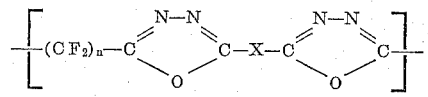

wherein X is an arylene radical or substituted arylene radical as defined above. While these structures are preferred, it is possible for X and Y to both be arylene in the same unit so long as other units in the polymer molecule contain sufficient —(CF$_2$)$_n$— groups to give an overall composition thereof in said molecule of at least 30 mole percent. It is to be understood that the $n$'s in the same unit or in different units can be different depending on the $n$ values of the —(CF$_2$)$_n$— groups in the reactants. The preferred $n$ value is 6. The arylene or substituted arylene can vary for different units in the same polymer molecule, the identity of said aromatic radicals depending on those present in the reactants. The number average molecular weights of these polymers can range from about 1,000 to 500,000.

Representative examples of specific polymers within the scope of the present invention include polymers which consist essentially of units such as:

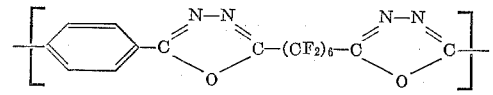

and

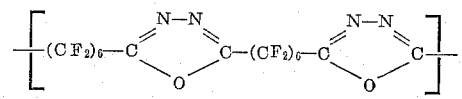

arranged in head-to-tail fashion.

With reference to the process for the preparation of the novel polymers of the present invention, the reactants hereinbefore described are contacted in an inert solvent at atmospheric pressure with liberation of hydrogen halide and nitrogen.

The molecular weight of the polymers depends on the value of the molar ratio of the bis tetrazole and the diacyl halide, the temperature of the reactor, and the length of the reaction time. The closer the value of the molar ratio approaches unity and the longer the reaction time, the higher is the degree of polymerization. Representative reaction times range between 3 and 15 days. Raising the temperature increases the molecular weight of the polymer; however, those skilled in the art will recognize that the extent to which the temperature can be elevated will be limited by such factors as the thermal stability of the reactants. Representative reaction temperatures range between 80 and 115° C.

Any solvent can be employed which permits the desired reactions to occur but which, in itself, is not permanently affected by the reactants or the product polymers except possibly as an acceptor for the liberated hydrogen halide. The monomers must be essentially completely soluble in the solvent.

When an arylene bis tetrazole is employed it is desirable to use pyridine as the reaction medium; in a representative procedure about 10–12 parts by weight of total reactants are employed in 100 milliliters of this solvent. The mixture is heated to reflux and kept at reflux until the amount of nitrogen collected indicates completion of the reaction. After the solution has been allowed to cool, it is poured into an excess volume of water to precipitate the polymer which is then collected by conventional filtration or centrifugation procedures. When an aliphatic bis tetrazole is employed, the same procedure using pyridine as the solvent is also suitable. If only perfluoromethylene groups are present for X and Y, the reaction is preferably carried out in a similar manner in acetonitrile solvent. In representative procedures, about 5 to 10 parts by weight of reactants are used for every 100 volumes of this solvent. After the reaction mixture has been allowed to cool, the insoluble polymer product is completely separated therefrom by addition of water; the product can then be collected by conventional filtration or centrifugation procedures.

Representative examples of the bis tetrazole which can be used include: para-phenylene-bis-tetrazole; and dodecafluorohexane-1,6-bis-tetrazole. These bis tetrazoles are made from the corresponding dinitriles with sodium azide and lithium chloride in methyl Cellosolve according to the general procedure of J. Saurer, R. Huisgen, and H. J. Sturm, Tetrahedron, 2 (1960).

The dinitriles can be prepared from the corresponding dicarboxylic acids. The following sequence, taken from U.S. Patent 2,515,246 illustrates a representative procedure:

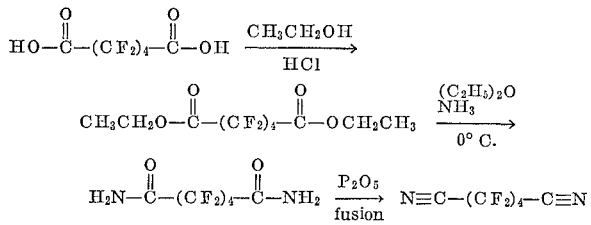

The preferred diacyl halides are the diacyl chlorides. Diacyl bromides and diacyl fluorides are also suitable. Both aliphatic and aromatic diacyl halides are operable in the present invention. Representative examples of the aliphatic diacyl chlorides which can be used are: hexafluoroglutaryl chloride; octafluoroadipoyl chloride; dodecafluorosuberyl chloride; hexadecafluorosebacyl chloride; perfluorothapsoyl chloride. Representative examples of the aryl diacyl chlorides include: terephthaloyl chloride; isophthaloyl chloride; 4,4'-biphenyloyl chloride; 2,2'-biphenyloyl chloride; 3,5-pyridyloyl chloride.

Representative examples of the present invention are as follows. Parts are by weight.

*Example 1*

A. *Preparation of p-phenylene-bis-tetrazole.*—The bis-tetrazole was prepared by refluxing a mixture of sodium azide, lithium chloride, terephthalonitrile, and methyl Cellosolve according to the procedure of J. Saurer, R. Huisgen, and H. J. Sturm, Tetrahedron, 2, 241–251 (1960).

B. *Preparation of dodecafluorosuberic acid.*—1,8-bis (methylthio)perfluoroctane (39.4 parts) was heated with stirring with 40 parts of concentrated sulfuric acid (95–98%) for one hour at 155° C. to 160° C. The resulting reaction mixture was cooled and added to ice water. The aqueous phase was filtered to remove sulfur and tarry materials and the filtrate was extracted with diethyl ether. The ether extract, on drying and evaporation, gave 23.4 parts (69% yield) of dodecafluorosuberic acid dihydrate, identified as its dianilium salt, M.P. 183° C. and the diacid chloride, B.P. 112° C./150 mm.

C. *Preparation of dodecafluorosuberyl chloride.*—To 109 grams (0.257 gram-mole) of dodecafluorosuberic acid dihydrate at 25° C. at atmospheric pressure were added 213 grams (1.1 gram-moles) of benzotrichloride. After the initial gas evolution ceased, the mixture was refluxed at atmospheric pressure with stirring for 5 hours. Distillation under reduced pressure gave 103 grams (94%) of a clear pink liquid, B.P. 89–102° C./50 mm. Distillation of this sample through an 18 inch Vigreaux column gave a colorless, well-defined fraction, B.P. 90° C./50 mm.

D. *Formation of a poly-1,3,4-oxadiazole in pyridine.*— To a mixture of 8.1276 grams (0.01903 gram-mole) of the dodecafluorosuberyl chloride and 4.0733 grams (0.01903 gram-mole) of p-phenylene-bis-tetrazole at 25° C. at atmospheric pressure were added 100 milliliters of freshly distilled pyridine. The mixture became homogeneous upon warming. After refluxing at 115° C. for 3 days with stirring, the solution was cooled and added to 1 liter of cold water. The product (1.8 grams) was collected on a filter and dried, and had a M.P. of 200° C. A brittle brown film was pressed from it at 150° C. The analysis of the product was made on the basis of the following structural unit:

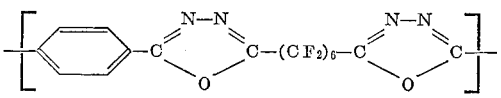

of which $C_{16}H_4F_{12}N_4O_2$ is the formula. From this formula, the product should analyze: C, 37.5; H, 0.18; F, 44.5; N, 10.9 wt. percent. Found: C, 39.7; H, 1.85; F, 44.2; N, 9.2 wt. percent.

*Example 2*

A. *Preparation of dodecafluorohexane - 1,6 - bis - tetrazole.*—A mixture of 39.8 grams (0.113 gram-mole) of perfluorosuberonitrile (preparation reported in U.S. Patent 2,554,786) 16.2 grams (0.25 gram-mole) of sodium azide, and 13.2 grams (0.25 gram-mole) of ammonium chloride in 132 milliliters of dimethyl formamide was stirred at atmospheric pressure for about 16 hours at 25–30° C. and then at 100° C. for 8 hours. After the dimethyl formamide had been distilled off under vacuum (20 mm. Hg), the residue was dissolved in 500 milliliters of water at 26° C., and the bis-tetrazole precipitated by the addition of 3 molar hydrochloric acid until the pH of the solution was less than 7. The precipitate collected weighed 46.0 grams (93% yield) and melted at 175° C. with decomposition. The product was then recrystallized from water.

B. *Preparation of the perfluoropoly-1,3,4-oxadiazole.*— To 3.292 grams (0.0077 gram-mole) of dodecafluorosuberyl chloride at 25° C. at atmospheric pressure was added, with stirring, a solution of 3.3695 grams (0.00769 gram-mole) of dodecafluorohexane-1,6-bis-tetrazole in 50 milliliters of acetonitrile. After refluxing at 80° C., while agitated, for 7 days, the mixture was cooled to 25–30° C.; the insoluble polymer was filtered off and dried. The analysis of the product was made on the basis of the following structural unit:

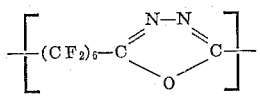

of which $C_8F_{12}N_2O$ is the formula. From this formula, the product should analyze: C, 26.5; H, 0.0; F, 62.0; N, 7.6 wt. percent. Found (in two separate analyses): C, 25.8, 25.9; H, 1.0, 1.9; F, 60.0, 60.1; N, 8.4, 8.5 wt. percent.

Inherent viscosity in acetone (0.1% by weight solution at 30° C.): 0.10, 0.11.

This reddish-orange product was not affected by concentrated sulfuric acid or concentrated nitric acid at 100° C. It was elastomeric from 65° C. to at least 120° C.; at 300° C. it became a mobile liquid.

As many apparently widely different embodiments of this invention may be made without departing from the spirit and scope thereof, it is to be understood that this invention is not limited to the specific embodiments except as defined in the appended claims.

What is claimed is:
1. A process which comprises contacting and reacting in the presence of an inert solvent, 0.875 to 1.125 molar proportions of a bis-tetrazole of the formula

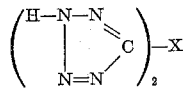

with a molar proportion of a diacyl halide of the formula

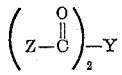

wherein Z=halogen, X and Y are independently selected from the group consisting of $-(CF_2)_n-$, in which $n=3-14$, and arylene, and with the proviso that in the reactants at least 30 mole percent of the total number of X's and Y's are $-(CF_2)_n-$, and obtaining as a result thereof a polymer consisting essentially of units, joined head-to-tail, having the structure

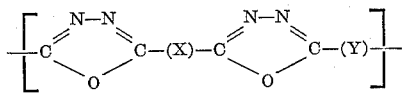

wherein X and Y have the same meaning as above.

2. A process which comprises contacting and reacting at a temperature between 80–115° C. in the presence of an inert solvent for a sufficient time to cause polymerization, 0.875 to 1.125 molar proportions of a bis-tetrazole of the formula

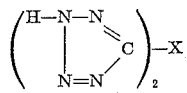

with a molar proportion of a diacyl halide of the formula

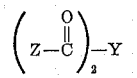

wherein Z=halogen, X and Y are independently selected from the group consisting of $-(CF_2)_n-$, in which $n=3-14$, and arylene, and with the proviso that in the reactants at least 30 mole percent of the total number of X's and Y's are $-(CF_2)_n-$, and obtaining as a result thereof a polymer having a molecular weight of at least 1000 which consists essentially of units, joined head-to-tail, having the structure

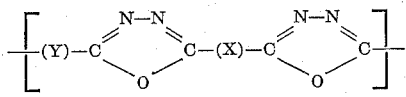

wherein X and Y have the same meaning as above.

3. The process of claim 2 wherein bis-tetrazole is p-phenylene-bis-tetrazole, diacyl halide is dodecafluorosuberyl chloride and the inert solvent is pyridine.

4. The process of claim 2 wherein bis-tetrazole is dodecafluorohexane-1,6-bis-tetrazole, diacyl halide is dodecafluorosuberyl chloride, and the inert solvent is acetonitrile.

5. The process of claim 2 wherein the molar proportions of the bis tetrazole and the diacyl halide are substantially equal.

References Cited by the Examiner

UNITED STATES PATENTS 2,515,246  7/1950  McBee et al. _____ 260—583

FOREIGN PATENTS 884,973  12/1961  Great Britain.

OTHER REFERENCES

Journal of Polymer Science, vol. 24 (1957), pp. 33–41; p. 34 relied on.
Tetrahedron, Saurer et al., vol. 11, pp. 241–251.

JOSEPH L. SCHOFER, *Primary Examiner.*

DONALD E. CZAJA, *Examiner.*

L. WOLF, *Assistant Examiner.*